(12) United States Patent
Igarashi et al.

(10) Patent No.: US 11,863,211 B2
(45) Date of Patent: Jan. 2, 2024

(54) OPTICAL COMMUNICATION SYSTEM AND OPTICAL COMMUNICATION METHOD

(71) Applicant: NIPPON TELEGRAPH AND TELEPHONE CORPORATION, Tokyo (JP)

(72) Inventors: Ryo Igarashi, Musashino (JP); Masamichi Fujiwara, Musashino (JP); Kazutaka Hara, Musashino (JP); Takuya Kanai, Musashino (JP); Yasutaka Kimura, Musashino (JP); Atsuko Kawakita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/908,527

(22) PCT Filed: Mar. 4, 2020

(86) PCT No.: PCT/JP2020/009025
§ 371 (c)(1),
(2) Date: Aug. 31, 2022

(87) PCT Pub. No.: WO2021/176578
PCT Pub. Date: Sep. 10, 2021

(65) Prior Publication Data
US 2023/0163852 A1    May 25, 2023

(51) Int. Cl.
*H04B 10/294* (2013.01)
*H04J 14/02* (2006.01)
(Continued)

(52) U.S. Cl.
CPC ..... *H04B 10/25756* (2013.01); *H04B 10/278* (2013.01); *H04B 10/294* (2013.01); *H04J 14/0202* (2013.01); *H04J 14/0221* (2013.01)

(58) Field of Classification Search
CPC ............. H04B 10/294; H04B 10/25756; H04J 14/0202; H04J 14/0221
(Continued)

(56) References Cited

U.S. PATENT DOCUMENTS

2004/0131358 A1* 7/2004 Jung ................... H04B 10/272
398/72
2006/0275037 A1* 12/2006 Evans .................. H04B 10/27
398/71

(Continued)

OTHER PUBLICATIONS

P. Lafata and J. Vodrazka, Perspective Application of Passive Optical Network with Optimized Bus Topology, Journal of Applied Research and Technology, vol. 10, No. 3, 2012, pp. 340-346.
(Continued)

*Primary Examiner* — Li Liu
(74) *Attorney, Agent, or Firm* — Harness, Dickey & Pierce, P.L.C.

(57) ABSTRACT

An optical communication system configured with a station-side apparatus and a plurality of subscriber-side apparatuses in a bus network topology includes an optical amplification unit installed on a station side, and a drop unit configured to branch an optical signal and excitation light, wherein the optical amplification unit includes an amplifier configured to amplify a downlink signal, and an excitation light output unit configured to output the excitation light for amplifying an uplink signal to a communication path, and the drop unit changes a branching ratio in accordance with a wavelength of the optical signal so that a transmission loss of the excitation light with respect to a trunk fiber is reduced.

7 Claims, 20 Drawing Sheets

(51) Int. Cl.
*H04B 10/2575* (2013.01)
*H04B 10/278* (2013.01)

(58) Field of Classification Search
USPC .............................................. 398/73, 85, 94
See application file for complete search history.

(56) References Cited

U.S. PATENT DOCUMENTS

2014/0219660 A1* 8/2014 Zhu .................... H04J 14/0246
398/67
2017/0272197 A1* 9/2017 Binti Ahmad ..... H04B 10/2972

OTHER PUBLICATIONS

Masahiro Iwabuchi et al., Fiber type WDM optical coupler, Oki Technical Review, vol. 69, No. 2, 2002 No. 190, pp. 88-91.

* cited by examiner

OPTICAL COMMUNICATION SYSTEM AND OPTICAL COMMUNICATION METHOD

CROSS-REFERENCE TO RELATED APPLICATIONS

This application is a 371 U.S. National Phase of International Application No. PCT/JP2020/009025, filed on Mar. 4, 2020. The entire disclosure of the above application is incorporated herein by reference.

TECHNICAL FIELD

The present invention relates to an optical communication system and an optical communication method.

BACKGROUND ART

Optical access technologies in accordance with the Passive Optical Network (PON) scheme have been standardized by the IEEE (The Institute of Electrical and Electronics Engineers) and the ITU-T (International Telecommunication Union Telecommunication Standardization Sector). The optical access technologies in accordance with the PON scheme are widely used in recent optical access networks.

FIG. 1 is a schematic diagram illustrating a configuration of an optical access network 5 (hereinafter referred to as a "PON system 5") in accordance with the PON scheme. As illustrated in FIG. 1, in the PON system 5, one Optical Line Terminal (OLT) 10 is connected to a plurality of Optical Network Units (ONUs) 20 by an optical fiber 15 to perform communication with each other. The OLT 10 is an optical line termination apparatus installed on a station facility side, and each ONU 20 is an optical line termination apparatus installed on a subscriber side. In the PON scheme, the optical fiber 15 connected to the OLT 10 is branched into a plurality of communication paths by an optical splitter 30 (optical coupler). Each of the resultants of the branched optical fiber 15 is connected to each of the plurality of ONUs 20.

Note that FIG. 1 illustrates a case that three ONUs 20 are present as an example where the number of ONUs 20 is optional.

In a downlink communication, an optical signal (downlink signal) transmitted from the OLT 10 is received by each ONU 20. In the downlink communication in the PON system 5, each ONU 20 selects and receives only the downlink signal in a time slot assigned to the ONU 20 in advance. In an uplink communication, an optical signal (uplink signal) transmitted from each ONU 20 is received by the OLT 10. In the uplink communication in the PON system 5, each ONU 20 transmits the uplink signal only in a time slot assigned to the ONU 20 in advance. In this way, collision is avoided between the optical signal transmitted and received by one ONU 20 and the optical signal transmitted and received by another ONU 20.

Thus, in the PON system 5, one OLT 10 and one optical fiber 15 are shared by the plurality of ONUs 20 (i.e., a plurality of subscribers). This enables the PON system 5 to suppress an increase in equipment costs and provide economical high speed optical access services.

Conventionally, in the PON systems, a double star network topology mainly has been under study. The double star network topology is a network configuration that is effective particularly in a case that densely existing users are required to be efficiently accommodated, like a FTTH (Fiber To The Home), for example. However, a study is recently underway to accommodate Internet of Things (IoT), mobile networks, and the like in the optical access network. In this case, it is important to flexibly select the network topology depending on the situation. For example, it is conceivable to apply a bus network topology in such an optical access network. Hereinafter, the optical access network to which the bus network topology is applied is referred to as a "bus type optical access network".

FIG. 2 is a schematic diagram illustrating a configuration of a bus type optical access network 6. As illustrated in FIG. 2, in the bus type optical access network 6, the optical fiber 15 includes one trunk fiber 16 and a plurality of branch fibers 17. The OLT 10 is connected to each of the plurality of ONUs 20 by one trunk fiber 16 and a plurality of branch fibers 17. As illustrated in FIG. 2, each branch fiber 17 connects corresponding ONU 20 with a drop point 31 located on the trunk fiber 16.

The communication path of the downlink signal transmitted from the OLT 10 is branched into two communication paths, the trunk fiber 16 and the branch fiber 17 at the drop point 31. Here, in a case that the drop point 31 is an equal branch power splitter, an optical signal (downlink signal) having an identical intensity is output to each of these two communication paths. In this case, each main signal is subjected to a drop loss of 3 [dB] (50[%]).

In the bus type optical access network 6, in a case that the downlink signal transmitted from the OLT 10 reaches the ONU 20 present in an adjacent area, the number of drop points 31 passed through in the communication path is relatively small. On the other hand, in the bus type optical access network 6, in a case that the downlink signal transmitted from the OLT 10 reaches the ONU 20 present in a far area, the number of drop points 31 passed through in the communication path is relatively large. Thus, in a case that the optical signal is transmitted to the ONU 20 present in the farther area, the more drop points 31 are passed through, and the cumulative drop loss more increases. Accordingly, there is a problem that the maximum transmission distance of the optical signal may decrease.

Conventionally, in order to solve such a problem, an approach has been proposed in which an unequal branch optical splitter is used as a drop point 31. The unequal branch optical splitter is an optical splitter in which a branching ratio of the optical signal is optimized (e.g., NPL 1). The unequal branch optical splitter is an optical splitter in which a transmittance at each output port is set to be asymmetric.

FIG. 3 is a schematic diagram illustrating a configuration of a bus type optical access network 7 using an unequal branch optical splitter 32. In comparison to the bus type optical access network 6 illustrated in FIG. 2, in the bus type optical access network 7 that uses the unequal branch optical splitter illustrated in FIG. 3, the transmittance with respect to the branch fiber 17 is decreased in the unequal branch optical splitter 32 (drop point) and the transmittance with respect to the trunk fiber 16 is increased.

As a result, in comparison to the bus type optical access network 6 illustrated in FIG. 2, in the bus type optical access network 7 that uses the unequal branch optical splitter illustrated in FIG. 3, the drop loss accumulated by passing through the plurality of drop points is further reduced in the communication path connecting the OLT 10 and the ONU 20 present in the farther area. Accordingly, the bus type optical access network 7 that uses the unequal branch optical splitter 32 can increase the maximum transmission distance of the optical signal.

Note that in the bus type optical access network 7 that uses the unequal branch optical splitter 32, if the drop loss increases too much in the unequal branch optical splitter 32 (drop point) in the communication path to the ONU 20 present in the adjacent area, a symbol error rate may not be error-free. Therefore, it is important to optimize the branching ratio of the optical signal in each unequal branch optical splitter 32 (see NPL 1). For example, as described above, the closer position to the station facility side (OLT 10 side) the ONU 20 is present at, the shorter the transmission distance is, and the smaller the number of unequal branch optical splitters 32 (drop points) passed through in the communication path is. Thus, in this case, the drop loss accumulated in the communication path is small, and a larger drop loss can be permitted in the unequal branch optical splitter 32 (drop point) directly connected to the ONU 20.

Note that it is similarly important to optimize the branching ratio of the optical signal in each unequal branch optical splitter 32 also in the case of the uplink communication.

However, as one technology for increasing the transmission distance of an optical signal in the optical access network, there is an optical amplification technology. The optical amplification technology is a technology for increasing the transmission distance by amplifying a signal intensity of an optical signal reduced due to a long-distance communication to a signal intensity that a receiver can identify. An effect of increasing the transmission distance by an optical amplifier depends on a position at which the optical amplifier is installed. This is because a magnitude of an optical noise entering the receiver differs depending on the position at which the optical amplifier is installed.

For example, in a case that an optical amplifier is installed on a transmitter side, the optical noise emitted by the optical amplifier attenuates due to transmission loss. Therefore, an intensity of the optical noise on reaching the receiver is small, and deterioration in reception characteristics is unlikely to occur. On the other hand, in a case that an optical amplifier is installed on the receiver side, the optical noise emitted by the optical amplifier enters the receiver with high intensity without transmission loss. As a result, the deterioration in the reception characteristics is likely to occur. From the foregoing, it is important to install the optical amplifier on the transmitter side in order to obtain a high effect in increasing the transmission distance of the optical signal in the optical access network.

In the optical access network, the uplink signal transmitted from the ONU 20 to the OLT 10 and the downlink signal transmitted from the OLT 10 to the ONU 20 are transmitted through the same optical fiber. Therefore, in order to increase the transmission distance, it is necessary to amplify both the uplink signal and the downlink signal.

As previously mentioned, in the optical access network, a plurality of subscribers share one OLT 10 and one optical fiber 15. This can suppress an increase in equipment costs and provide economical high speed optical access services. Thus, in order to economically increase the transmission distance by the optical amplifier, it is important to collect functions of the optical amplifier on the OLT 10 side and configure the functions of the optical amplifier to be shared by a plurality of users.

FIG. 4 is a schematic diagram illustrating a configuration of an optical access network 8 in which an optical amplifier 40 is installed on the OLT 10 side. As illustrated in FIG. 4, in the optical access network 8, the communication path is separated into a communication path through which a wavelength band of the uplink signal passes and a communication path through which a wavelength band of the downlink signal passes, and the separated communication paths are again coupled by two Wavelength Division Multiplexing (WDM) optical couplers 33. The WDM optical coupler 33 can separate one input signal per wavelength to be branched into a plurality of output ports.

As illustrated in FIG. 4, a lumped amplification type optical amplifier 40 is installed in each of the communication path through which the wavelength band of the uplink signal passes and the communication path through which the wavelength band of the downlink signal passes. The lumped amplification type optical amplifier 40 is an optical amplifier that concentratedly amplifies the optical signal at a point in the communication path. As illustrated in FIG. 4, both two optical amplifiers 40 are installed on the OLT 40 side.

As illustrated in FIG. 4, in the optical access network 8, in the downlink communication, the optical amplifier 40 is present on the transmitter side (OLT 10 side). Thus, in the downlink communication, an Amplified Spontaneous Emission (ASE) noise on reaching the receiver side (ONU 20 side) decreases due to the transmission loss, as described above. Therefore, in the downlink communication, a high effect is expected in increasing the transmission distance. On the other hand, in the uplink communication, the optical amplifier 40 is present on the receiver side (OLT 10 side). Therefore, in the uplink communication, the optical noise entering the receiver side (OLT 10 side) is relatively large. Therefore, in the uplink communication, the effect of increasing the transmission distance is limited.

In this way, in order to increase the transmission distance of the optical access network, the OLT 10 side needs to be provided with the optical amplification technology that decreases noises, particularly in the uplink communication. Recently, the distributed Raman amplification technology has been under study as such an optical amplification technology. The distributed Raman amplification technology is a technology in which light having high power, called excitation light, is incident on a communication path, and an optical signal is amplified by the effect of induced Raman scattering, which is one of the non-linear optical effects. The distributed Raman amplification technology is commonly known as an optical amplification technology with good noise characteristics. In the distributed Raman amplification technology, a wavelength of excitation light needs to be appropriately set depending on a wavelength of an optical signal to be amplified.

FIG. 5 is a schematic diagram illustrating a configuration of an optical access network 9a in which a concentrated optical amplifier and a distributed Raman amplification technology are used. FIG. 6 is a diagram illustrating a change in a signal intensity with respect to a transmission distance in the optical access network 9a. Note that in FIG. 6, a dot-dash line indicates the signal intensity in a case that the distributed Raman amplification technology is not used.

A downlink signal is amplified by a concentrated optical amplifier 41 immediately after being transmitted from the OLT 10. The amplified downlink signal then passes through the communication path and enters the ONU 20 (receiver). On the other hand, an uplink signal attenuates due to a transmission loss from immediately after being transmitted from the ONU 20. However, once the attenuated uplink signal enters a region where the intensity of the excitation light is high in the communication path, the attenuated uplink signal is gradually amplified by the effect of the distributed Raman amplification. In the distributed Raman amplification, unlike the amplification by the concentrated optical amplifier 41 described above, the communication path is an amplification medium. In this way, the uplink signal gradually obtains an amplification gain while propagating in the communication path. At this time, the optical noise generated by the distributed Raman amplification is also subjected to the transmission loss, and thus, an amount of optical noise on reaching the receiver side (OLT 10) is also decreased. As a result, the good noise characteristics are obtained.

In this manner, even in a case that the optical access network has an economical configuration in which the optical amplifier functions are collected on the OLT 10 side, the effects of optical noise can be reduced by using the distributed Raman amplification technology in the uplink communication. This allows the transmission distance to be increased.

CITATION LIST

Non Patent Literature

NPL 1: P. Lafata, J. Vodrazka, "Perspective Application of Passive Optical Network with Optimized Bus Topology", Journal of Applied Research and Technology, Vol. 10 No. 3, June 2012

NPL 2: Masahiro Iwabuchi, Tomoko Iwasaki, Tetsuo Imamura, "Fiber WDM optical coupler", Oki Technical Review, Issue 190, Vol. 69, No. 2, April 2002

SUMMARY OF THE INVENTION

Technical Problem

FIG. 7 is a schematic diagram illustrating a configuration of a bus type optical access network 9b in which the concentrated optical amplifier 41 and the distributed Raman amplification technology are used. FIG. 8 is a diagram illustrating a change in excitation light intensity with respect to a transmission distance in the bus type optical access network 9b. As illustrated in FIG. 7, the bus type optical access network 9b includes the drop points 31. In the bus type optical access network 9b, each drop point 31 is an equal branch optical splitter. In this case, in a far area that the optical signal reaches passing through more drop points 31 in the communication path, the intensity of the excitation light is significantly reduced as illustrated in FIG. 8, and thus, a decrease in the Raman gain is concerned. As such, conventionally, there is a problem in that the transmission distance is difficult to increase in the bus type optical access network.

The present invention is contrived in view of the above-described circumstances, and has an object to provide a technology for capable of increasing a transmission distance in a bus type optical access network.

Means for Solving the Problem

An aspect of the present invention is an optical communication system configured with a station-side apparatus and a plurality of subscriber-side apparatuses in a bus network topology, the optical communication system including an optical amplification unit installed on a station side, and a drop unit configured to branch an optical signal and excitation light, wherein the optical amplification unit includes an amplifier configured to amplify a downlink signal, and an excitation light output unit configured to output the excitation light for amplifying an uplink signal to a communication path, and the drop unit changes a branching ratio in accordance with a wavelength of the optical signal so that a transmission loss of the excitation light with respect to a trunk fiber is reduced.

An aspect of the present invention is the optical communication system described above, wherein in a case that the optical signal is a WDM signal including a plurality of wavelengths, the drop unit includes a WDM optical coupler in which a transmittance periodically changes depending on the wavelengths of the WDM signal.

An aspect of the present invention is the optical communication system described above further including a mirror unit installed on a subscriber side, wherein the optical amplification unit further includes monitored light output unit configured to output monitored light to a communication path, an intensity monitor unit configured to detect an intensity of the monitored light reflected by the mirror unit, and an analysis unit configured to determine a wavelength of the excitation light with reference to the intensity detected by the intensity monitor unit, and control the excitation light output unit to output the excitation light having the determined wavelength.

An aspect of the present invention is the optical communication system described above, wherein the analysis unit determines the wavelength so that the intensity of the monitored light detected by the intensity monitor unit is maximum.

An aspect of the present invention is the optical communication system described above, wherein the excitation light output unit sweeps the wavelength of the excitation light output to the communication path, and the analysis unit determines the wavelength so that the intensity of the monitored light changing as the wavelength of the excitation light is swept is maximum.

An aspect of the present invention is the optical communication system described above, wherein in a case that the excitation light includes a plurality of wavelengths, the excitation light output unit uses, as excitation light, light having a wavelength at which a transmittance in the drop unit with respect to the trunk fiber is high.

An aspect of the present invention is an optical communication method by an optical communication system configured with a station-side apparatus and a plurality of subscriber-side apparatuses in a bus network topology, the optical communication method including branching an optical signal and excitation light, amplifying a downlink signal by an amplifier installed on a station side, outputting the excitation light for amplifying an uplink signal to a communication path, and in the branching, changing a branching ratio in accordance with a wavelength of the optical signal so that a transmission loss of the excitation light with respect to a trunk fiber is reduced.

Effects of the Invention

According to the present invention, the transmission distance in the bus type optical access network can be increased.

BRIEF DESCRIPTION OF DRAWINGS

FIG. 6 is a diagram illustrating a change in a signal intensity with respect to a transmission distance in the optical access network 9a.

DESCRIPTION OF EMBODIMENTS

First Embodiment

Hereinafter, a first embodiment of the present invention will be described with reference to the drawings.

Figure 1:
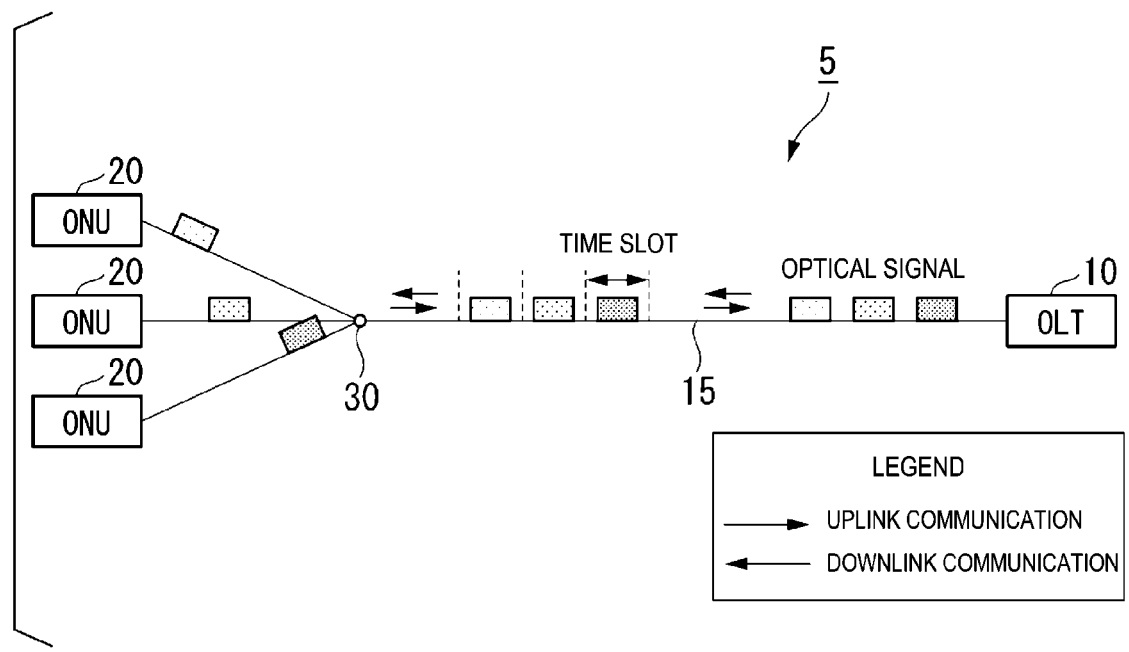
FIG. 1 is a schematic diagram illustrating a configuration of an optical access network 5 in accordance with a PON scheme.
Figure 2:
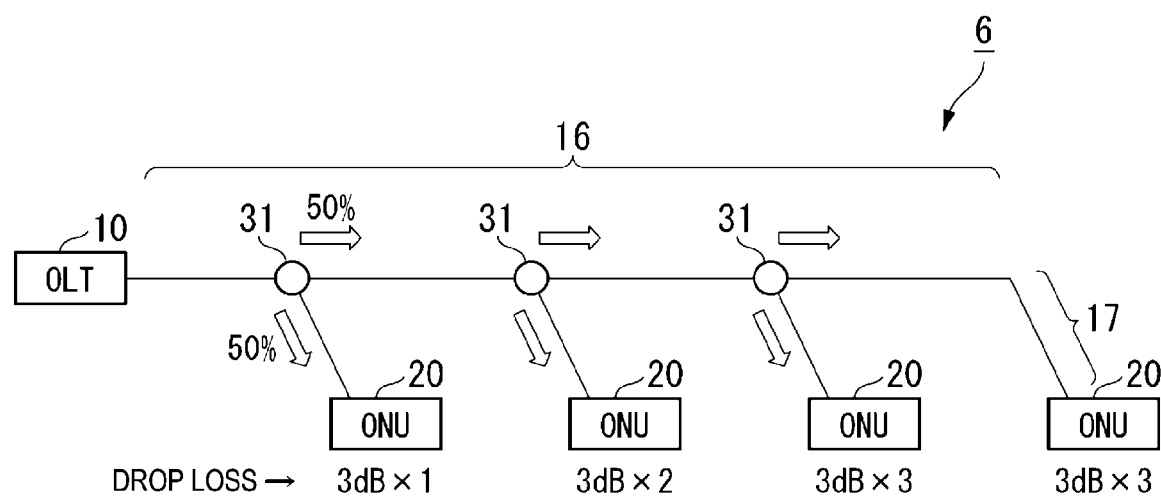
FIG. 2 is a schematic diagram illustrating a configuration of a bus type optical access network 6.
Figure 3:
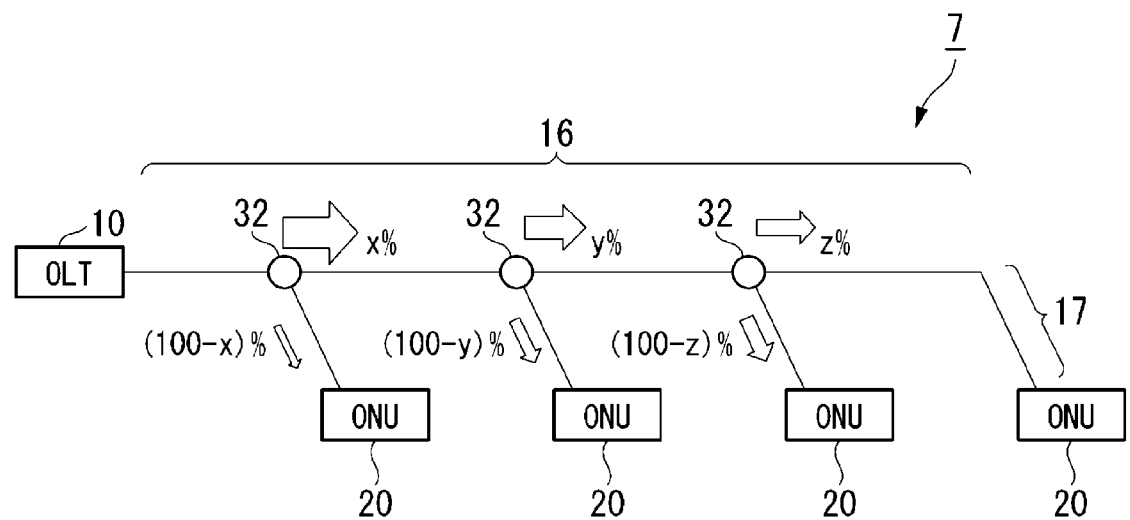
FIG. 3 is a schematic diagram illustrating a configuration of a bus type optical access network 7 using an unequal branch optical splitter 32.
Figure 4:
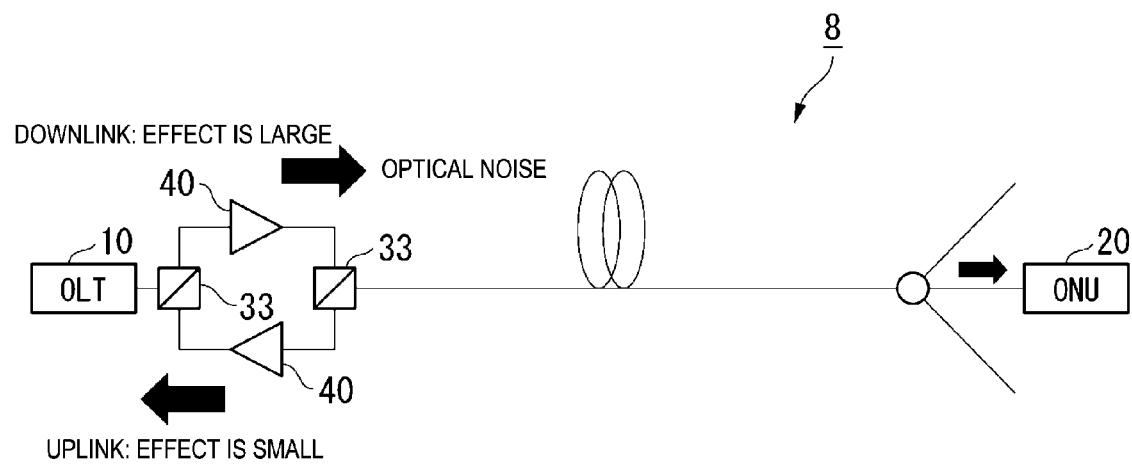
FIG. 4 is a schematic diagram illustrating a configuration of an optical access network 8 in which an optical amplifier is installed on an OLT 10 side.
Figure 5:
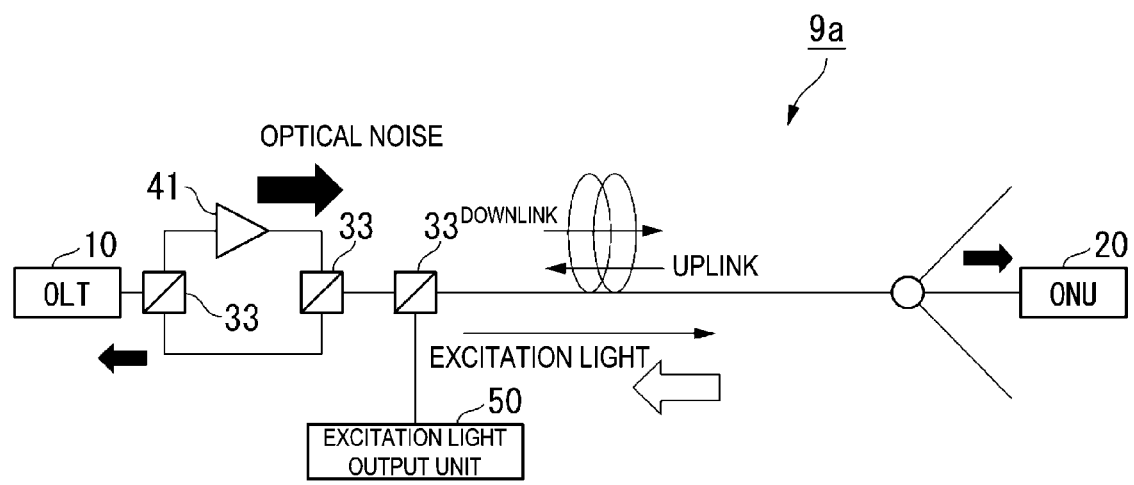
FIG. 5 is a schematic diagram illustrating a configuration of an optical access network 9a in which a concentrated optical amplifier and a distributed Raman amplification technology are used.
Figure 6:
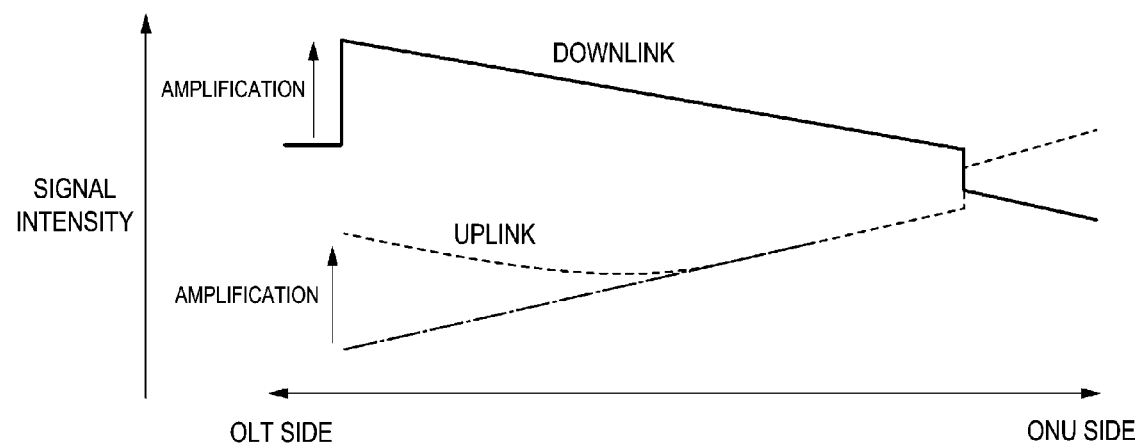
Figure 7:
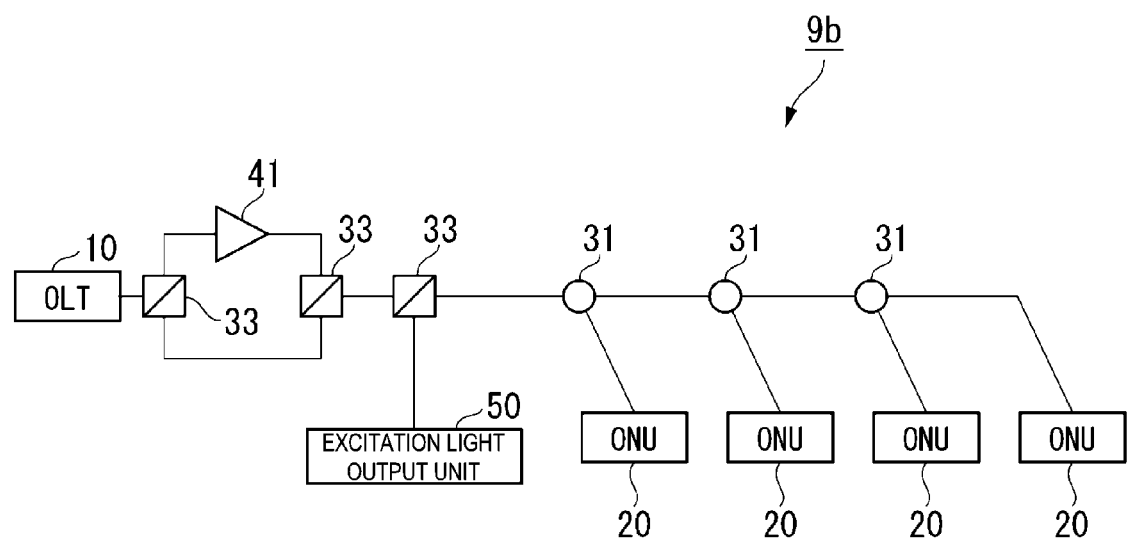
FIG. 7 is a schematic diagram illustrating a configuration of a bus type optical access network 9b in which a concentrated optical amplifier and a distributed Raman amplification technology are used.
Figure 8:
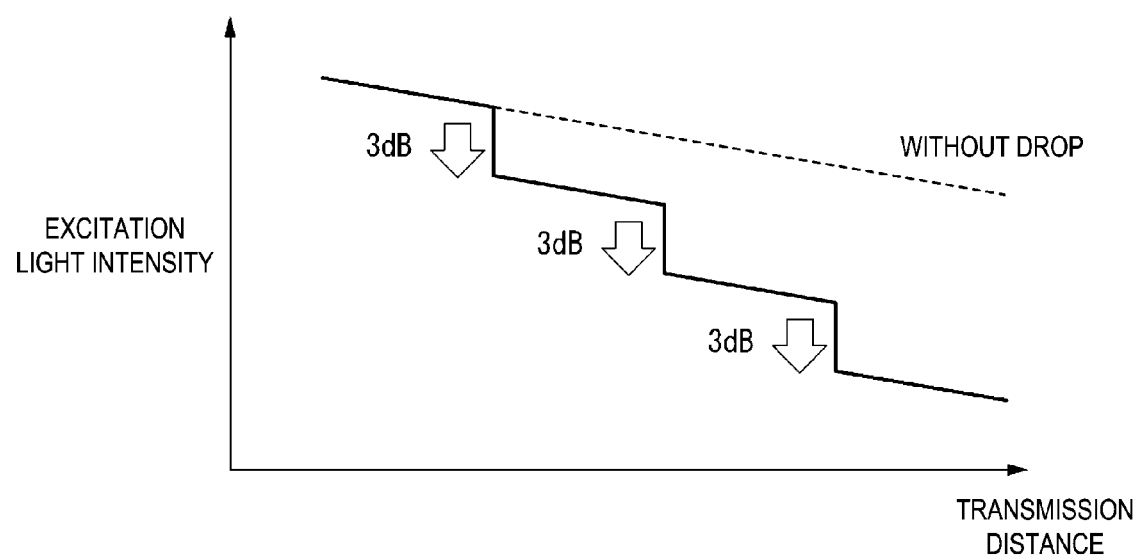
FIG. 8 is a diagram illustrating a change in excitation light intensity with respect to a transmission distance in the bus type optical access network 9b.
Figure 9:
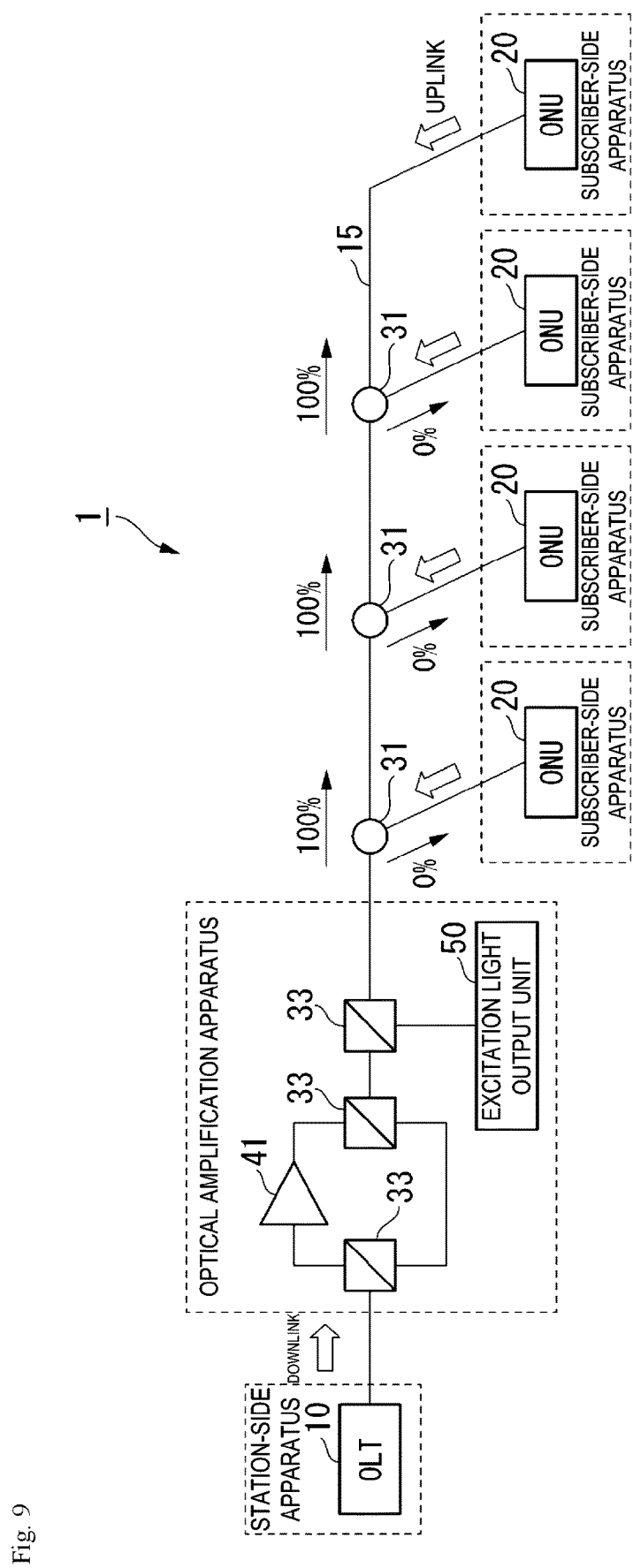
FIG. 9 is a schematic diagram illustrating a configuration of a bus type optical access network 1 according to a first embodiment of the present invention.

FIG. 9 is a schematic diagram illustrating a configuration of a bus type optical access network 1 according to the first embodiment of the present invention. As illustrated in FIG. 9, the bus type optical access network 1 includes an OLT 10 serving as a station-side apparatus and a plurality of ONUs 20 serving as subscriber-side apparatuses. The OLT 10 is connected to the plurality of ONU 20s by a communication path including an optical fiber 15 that is wired in a bus network topology.

As illustrated in FIG. 9, an optical amplification apparatus serving a function to amplify an optical signal is provided between the OLT 10 and the communication path. In the bus type optical access network 1, the communication path is separated into a communication path through which a wavelength band of an uplink signal passes and a communication path through which a wavelength band of a downlink signal passes, and the separated communication paths are again coupled by two WDM optical couplers 33.

As illustrated in FIG. 9, in a downlink communication, the optical signal (downlink signal) transmitted from the OLT 10 enters the optical amplification apparatus. In the optical amplification apparatus, the downlink signal propagates through the communication path through which the downlink signal passes of the communication paths separated by the WDM optical coupler 33. A concentrated optical amplifier 41 is installed in the communication path through which the downlink signal passes. The concentrated optical amplifier 41 amplifies the downlink signal. The amplified downlink signal propagates through the communication path and is received by each ONU 20.

On the other hand, as illustrated in FIG. 9, in an uplink communication, the optical signal (uplink signal) transmitted from each ONU 20 passes through the communication path, and then, enters the optical amplification apparatus. In the optical amplification apparatus, the uplink signal propagates through the communication path through which the uplink signal passes of the communication paths separated by the WDM optical coupler 33. The uplink signal passes through the optical amplification apparatus and is received by the OLT 10.

As illustrated in FIG. 9, the optical amplification apparatus is provided with an excitation light output unit 50. The excitation light output unit 50 makes excitation light for amplifying the uplink signal incident on the communication path. By doing so, once the uplink signal enters a region where an intensity of the excitation light is high in the communication path, the uplink signal is gradually amplified by the effect of the distributed Raman amplification.

The bus type optical access network 1 according to the present embodiment reduces a drop loss experienced by the excitation light at a drop point 31, and maximizes the Raman gain. In the present embodiment, the WDM optical coupler is used as the drop point 31. However, the WDM optical coupler assumed here can branch one input signal into a plurality of output ports, and change a branching ratio depending on a wavelength.

Figure 10:
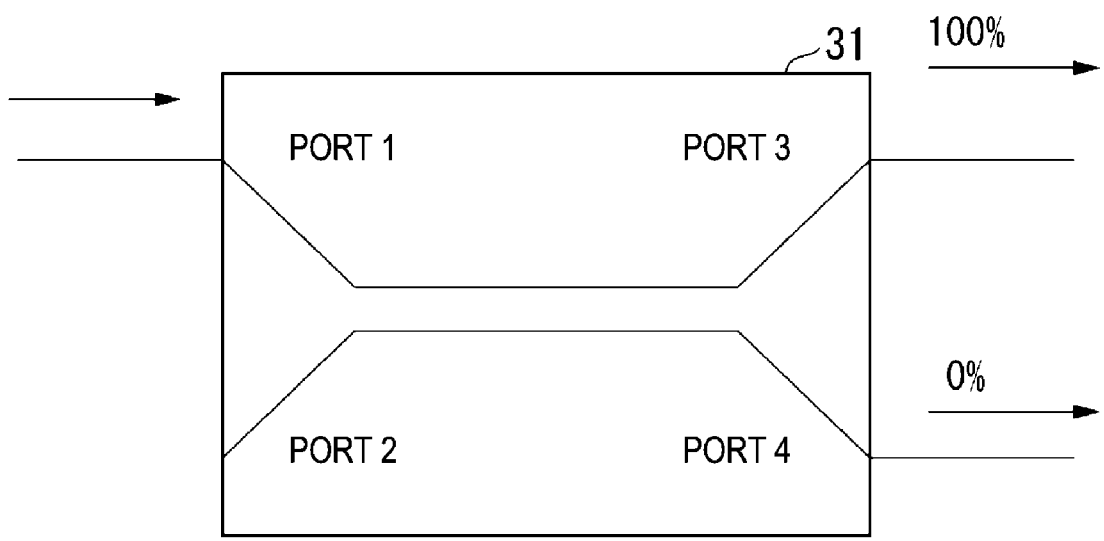
FIG. 10 is a schematic diagram illustrating a configuration of a drop point 31 of the bus type optical access network 1 according to the first embodiment of the present invention.

FIG. 10 is a schematic diagram illustrating a configuration of the drop point 31 (WDM optical coupler) of the bus type optical access network 1 according to the first embodiment of the present invention. In the present embodiment, as an example, the drop point 31 is a WDM optical coupler formed by melt drawing (for example, see NPL 2).

The drop point 31 (WDM optical coupler) is coupled by fusing portions of two optical fibers put into contact with each other. The drop point 31 propagates a portion of an optical signal propagating through one optical fiber to the other optical fiber. This distributes the optical signal input to an input port to a plurality of output ports. For example, in a case that an optical signal is input to a port 1 and a port 2, the optical signal is output from a port 3 and a port 4. For example, in a case that an optical signal is input to the port 3 and the port 4, the optical signal is output from the port 1 and the port 2. For example, a downlink signal is input to the port 1, and output from the port 3 and the port 4. For example, an uplink signal is input to the port 3 and the port 4, and output from the port 1 and the port 2.

If the drop point is an equal branch optical splitter, 50[%] of the optical signal input from the port 1 is output to each of the port 3 and the port 4. In contrast, in the drop point 31 (WDM optical coupler formed by melt drawing) according to the present embodiment, heat is applied to the optical fiber to stretch a coupling portion, and thereby, a branching ratio of the optical signal to each output port is controlled.

Figure 11:
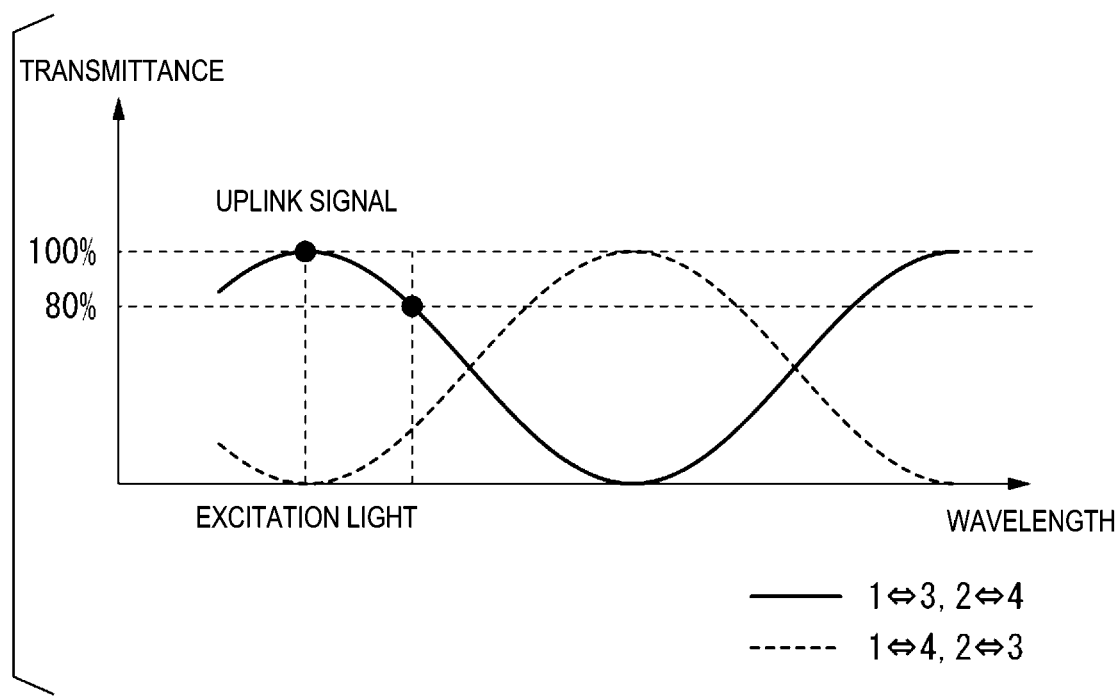
FIG. 11 is a diagram illustrating an example of a transmission characteristic of the drop point 31 of the bus type optical access network 1 according to the first embodiment of the present invention.

FIG. 11 is a diagram illustrating an example of a transmission characteristic of the drop point 31 of the bus type optical access network 1 according to the first embodiment of the present invention. In FIG. 11, a solid line waveform illustrates a ratio of transmission from the port 1 to the port 3, or from the port 3 to the port 1. In FIG. 11, a dashed waveform illustrates a ratio of transmission from the port 1 to the port 4, or from the port 4 to the port 1. Note that the port 2 is not used.

In the present embodiment, as an example, the branching ratio of the optical signal at the drop point 31 is (trunk fiber direction):(branch fiber direction)=80:20. Note that the trunk fiber direction is a direction from the port 1 to the port 3, and a direction from the port 3 to the port 1. The branch fiber direction is a direction from the port 1 to the port 4, and from the port 4 to the port 1.

On the other hand, the excitation light does not transmit in the branch fiber direction at the drop point 31 and is configured to entirely (100[%]) transmit in the trunk fiber direction. This keeps the light intensity of the excitation light high on reaching the far area, and thus, the Raman gain can be maximized.

Note that, in the present embodiment, the configuration in which the WDM optical coupler formed by melting drawing is used as the drop point 31 is described, as an example, but the present invention is not limited thereto. For example, even in a case that a PLC is used or a Mach-Zehnder waveguide is used, it is possible to realize the drop point that changes the branching ratio depending on the wavelength.

Second Embodiment

Hereinafter, a second embodiment of the present invention will be described with reference to the drawings. In the present embodiment, the optical signal is a WDM signal including a plurality of wavelengths.

Figure 12:
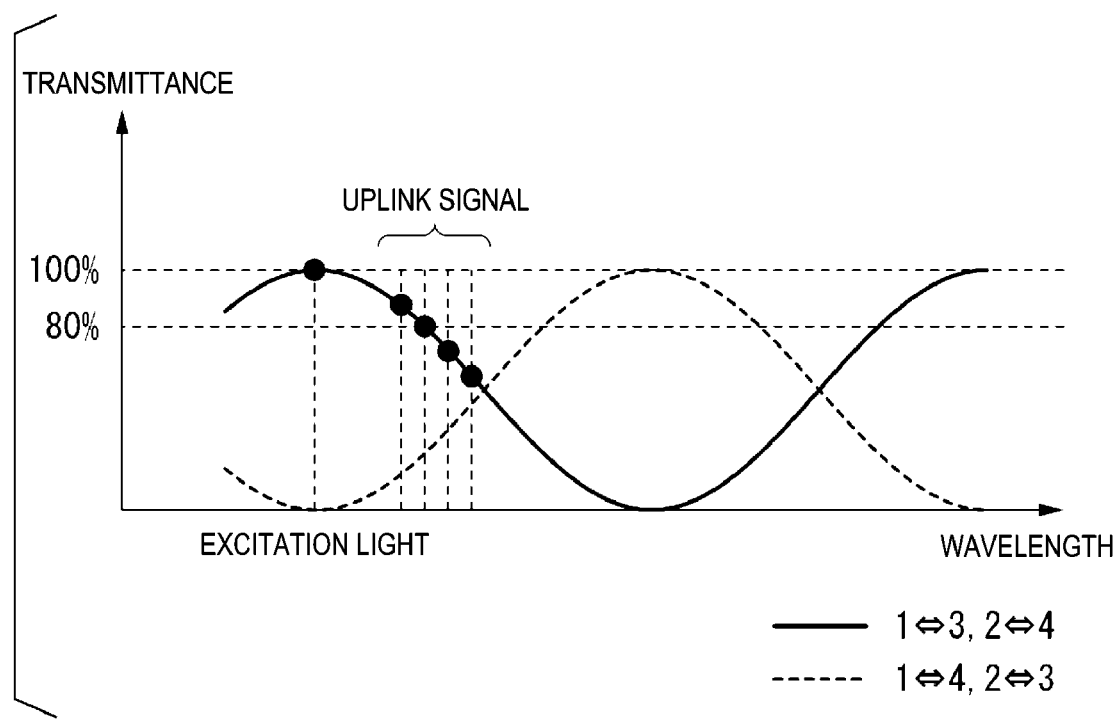
FIG. 12 is a diagram illustrating an example of a change in a wavelength arrangement of an optical signal and a transmittance in a WDM optical coupler.

FIG. 12 is a diagram illustrating an example of a change in a wavelength arrangement of an optical signal and a transmittance in a WDM optical coupler. In the case that the optical signal is a WDM signal including a plurality of wavelengths, the wavelength varies depending on the signal. As a result, the transmittance also changes depending on the signal, and therefore, variations in the transmission distance will occur. As a method for solving this, it is conceivable to use a WDM optical coupler in which the transmission ratio with respect to each port changes periodically at the same period as a wavelength interval of a WDM signal.

Figure 13:
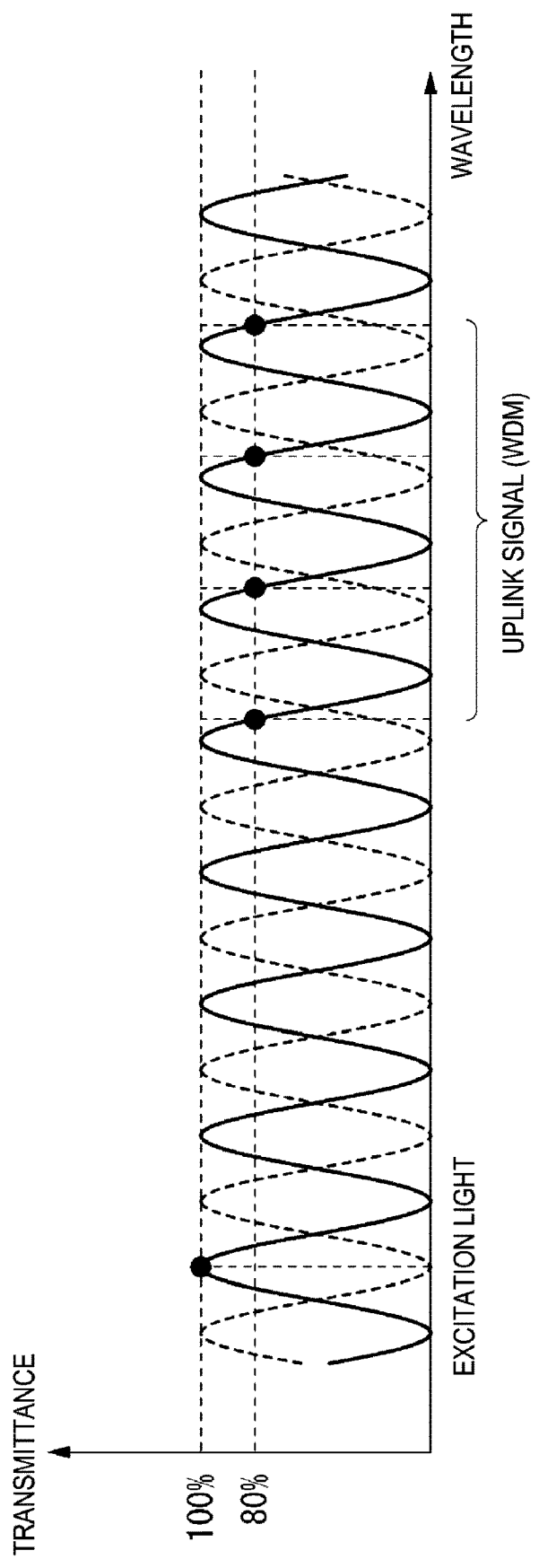
FIG. 13 is a diagram illustrating how the transmittance with respect to each port changes at the same period as a wavelength interval of a WDM signal.

FIG. 13 is a diagram illustrating how the transmittance with respect to each port changes at the same period as the wavelength interval of the WDM signal. In this case, the transmittances of all the signals can be kept constant. The wavelength of the excitation light is set so that the transmittance is 100[%] as described above.

Generally, the wavelength of the excitation light is set in accordance with a wavelength of an optical signal to be amplified. For example, in a case that a standard single mode fiber is used, light at a frequency higher than the optical signal by about 13 [THz] is used as the excitation light. This results in a wavelength difference of 100 [nm] in a 1550 [nm] band. Thus, in a case that excitation light of 1500 [nm] is used, an amplification gain is generated near 1600 [nm].

Figure 14:
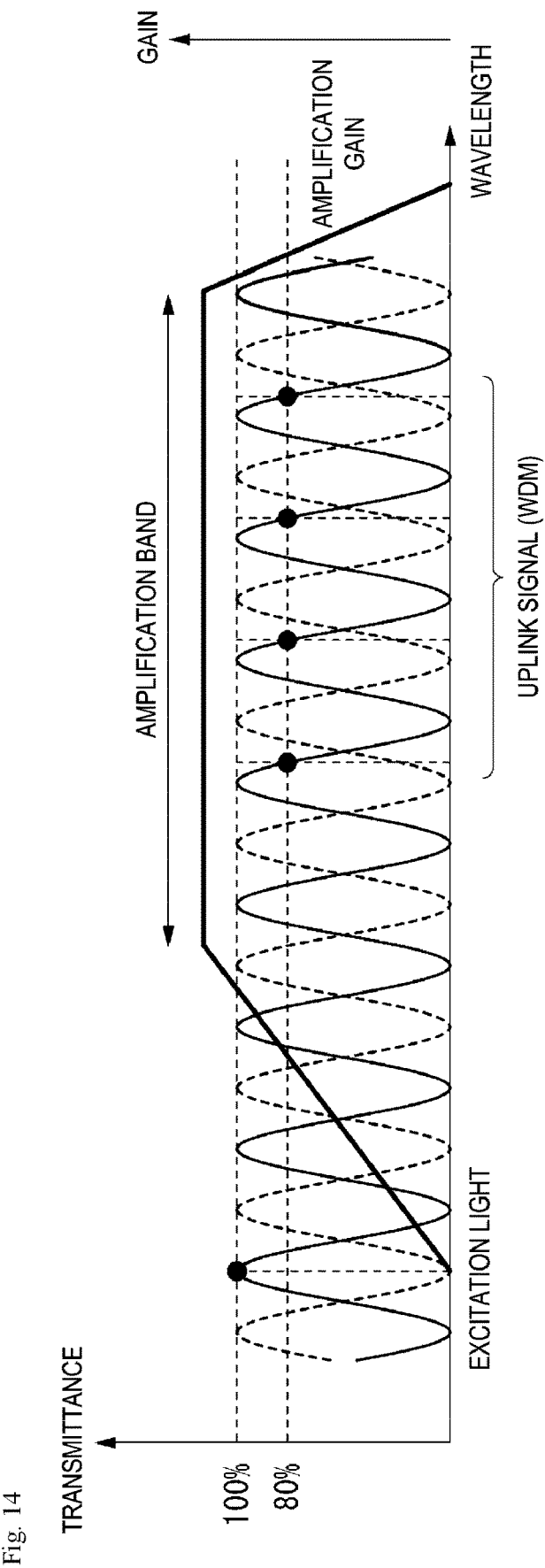
FIG. 14 is a diagram illustrating how an amplification gain is generated.

FIG. 14 is a diagram illustrating how an amplification gain is generated. In FIG. 14, an amplification band indicates a region where the maximum amplification gain is obtained. In a case that the amplification band is sufficiently larger than the band of the WDM signal to be amplified by the distributed Raman amplification, there are a plurality of wavelengths of excitation lights in which the WDM signal to be amplified is in the amplification band and the transmission of the trunk fiber is 100[%], and the wavelength of the excitation light may be set to anywhere among these plural wavelengths.

Figure 15:
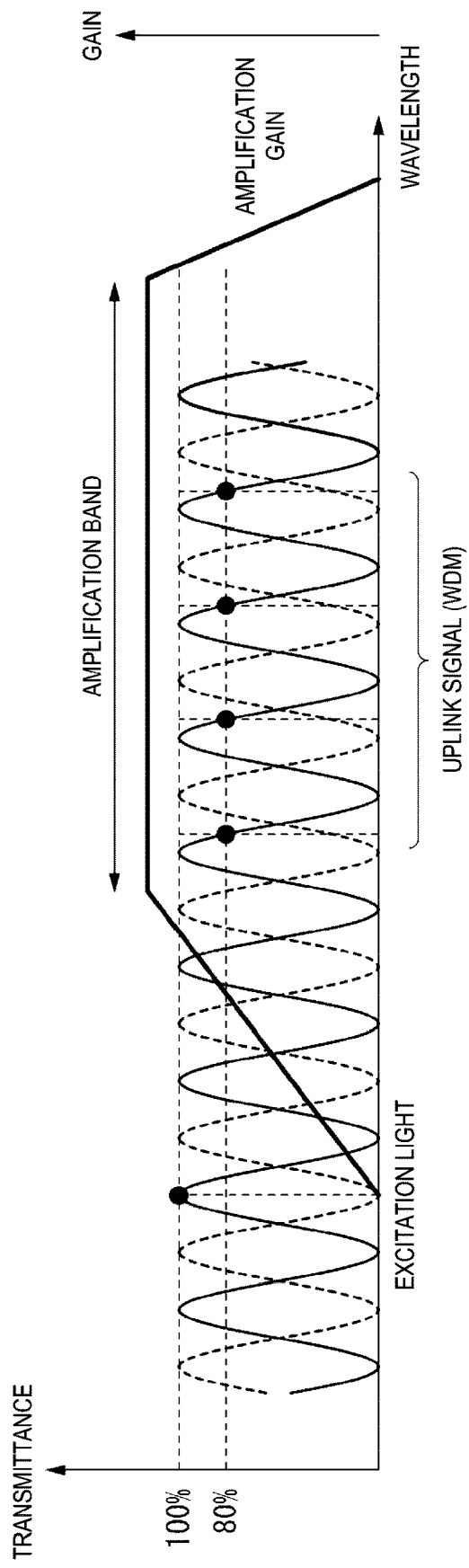
FIG. 15 is a diagram illustrating a case that a wavelength of excitation light is changed.

FIG. 15 is a diagram illustrating a case that a wavelength of excitation light is changed. In this way, even in a case that the wavelength of the excitation light is changed, the wavelength band of the WDM signal can be covered by the amplification band.

It is conceivable to perform amplification using a plurality of excitation lights for improving the Raman gain.

Figure 16:
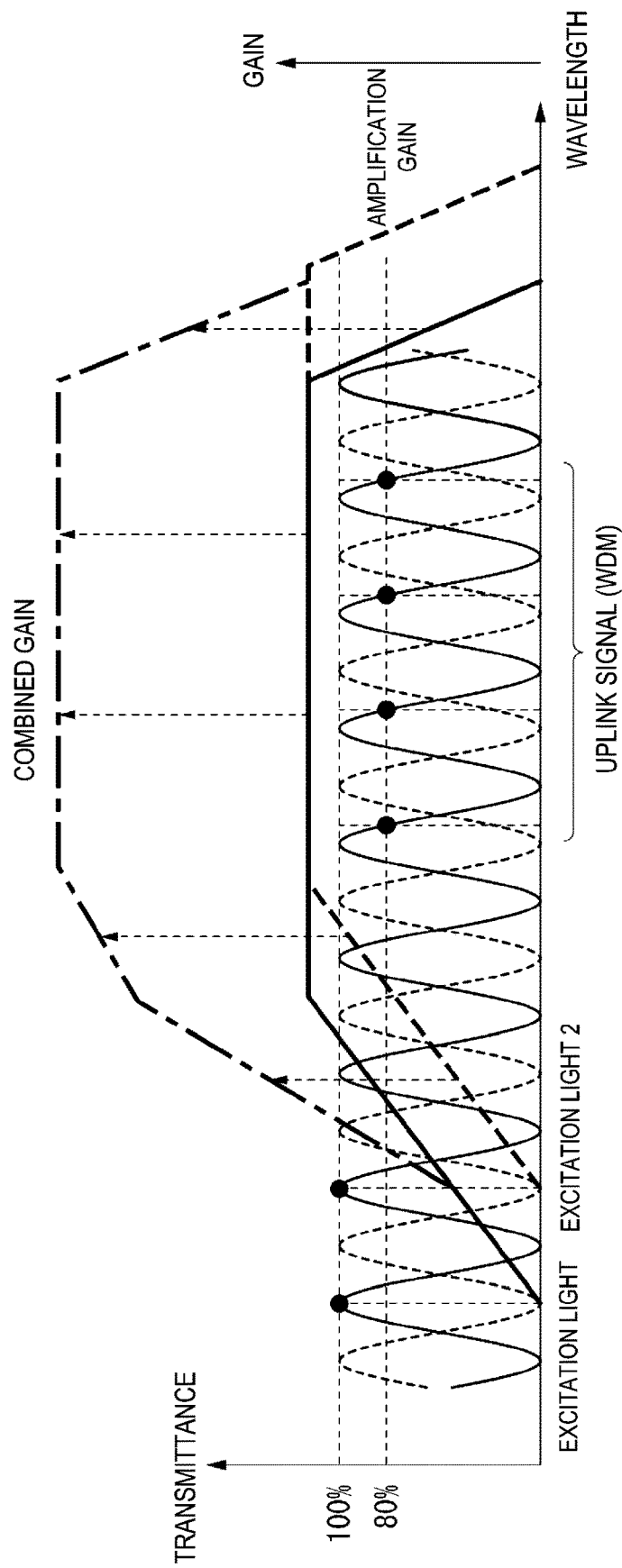
FIG. 16 is a diagram illustrating how amplification is performed using a plurality of excitation lights.

FIG. 16 is a diagram illustrating how amplification is performed using a plurality of excitation lights. In this case, light having a wavelength at which the transmittance in the WDM optical coupler with respect to the trunk fiber is high is used as the excitation light. For example, the Raman gain can be maximized by setting the wavelength of each excitation light beam so that the transmittance in the WDM optical coupler with respect to the trunk fiber is 100[%].

Third Embodiment

Hereinafter, a third embodiment of the present invention will be described with reference to the drawings.

Figure 17:
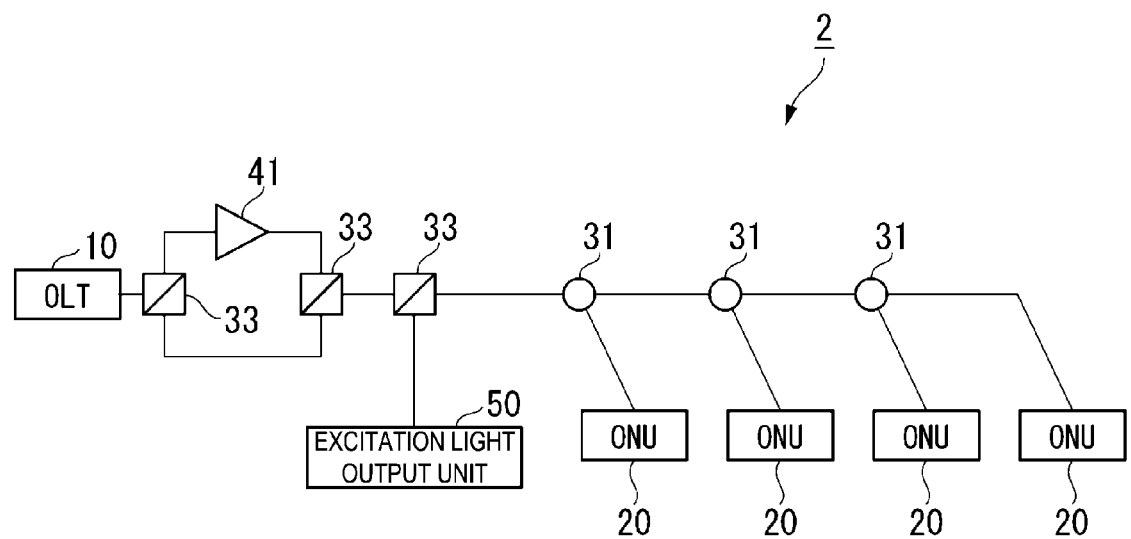
FIG. 17 is a schematic diagram illustrating a configuration of a bus type optical access network 2 according to a third embodiment of the present invention.

FIG. 17 is a schematic diagram illustrating a configuration of a bus type optical access network 2 according to the third embodiment of the present invention. The bus type optical access network 2 according to the present embodiment is an optical access network in which the concentrated optical amplifier 41 and the distributed Raman amplification technology are used.

As illustrated in FIG. 17, the bus type optical access network 2 includes the drop points 31. In the present embodiment, each drop point 31 is designed so that the transmittance with respect to the trunk fiber is 100[%] in the wavelength band of the excitation light. In the present embodiment, the drop point 31 is a WDM optical coupler.

However, in the strict sense of the word, the characteristics of an apparatus of the drop point (e.g., a WDM optical coupler) vary from individual to individual. Therefore, for maximizing the Raman gain, the wavelength of the excitation light needs to be optimized in conformity with the apparatus of the drop point to be used (e.g., the WDM optical coupler).

For maximizing the Raman gain, it is important to keep a section where the intensity of the excitation light is high longer. Hereinafter, the change in the excitation light intensity with respect to the transmission distance is illustrated in a case that the transmittance in each drop point 31 (WDM optical coupler) with respect to the trunk fiber is slightly less than 100%.

Figure 18:
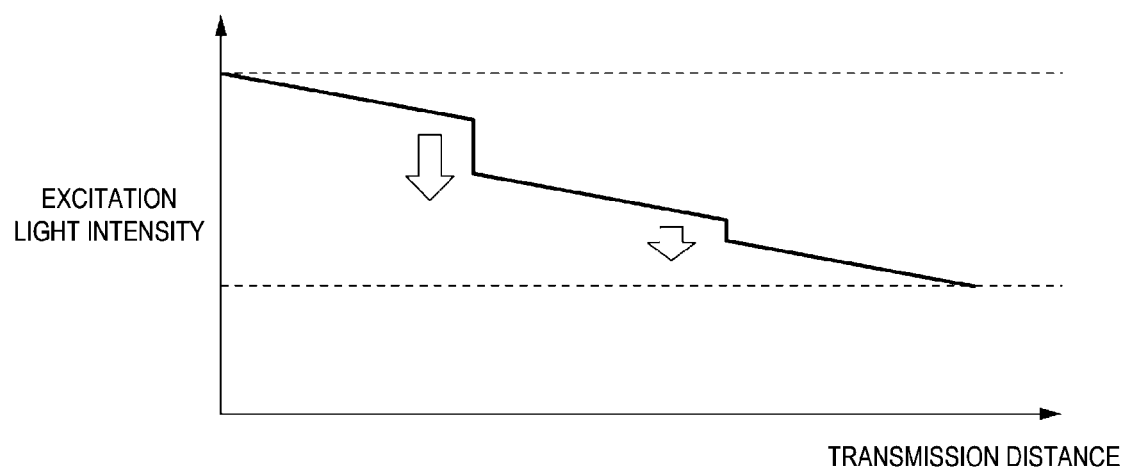
FIG. 18 is a diagram illustrating a change in excitation light intensity with respect to a transmission distance in a case that the drop point 31 with a relatively high transmission loss is present at a position close to the OLT 10.
Figure 19:
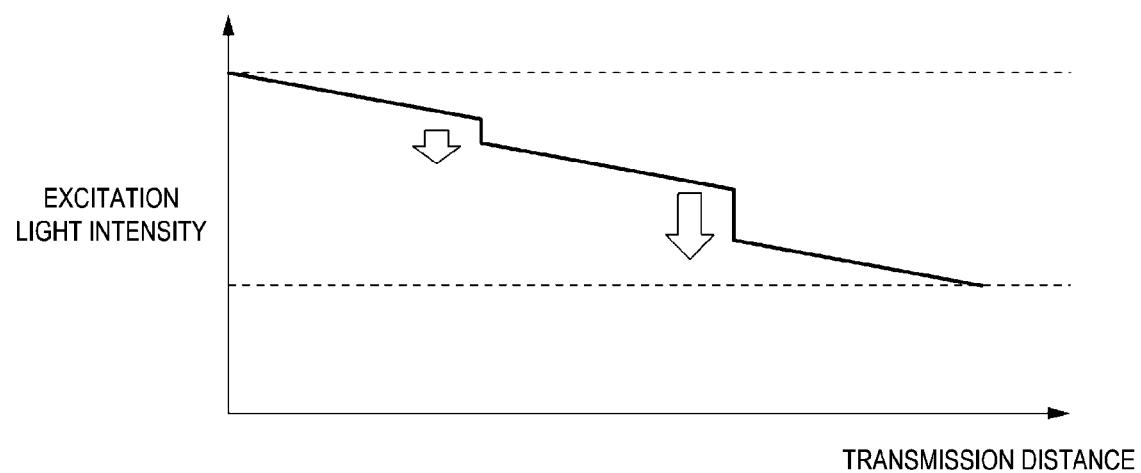
FIG. 19 is a diagram illustrating a change in excitation light intensity with respect to a transmission distance in a case that the drop point 31 with a relatively high transmission loss is present at a position close to the ONU 20.

FIG. 18 is a diagram illustrating the change in the excitation light intensity with respect to the transmission distance in a case that the drop point 31 with a relatively high drop loss is present at a position close to the OLT 10. FIG. 19 is a diagram illustrating the change in the excitation light intensity with respect to the transmission distance in a case that the drop point 31 with a relatively high drop loss is present at a position close to the ONU 20.

As illustrated in FIGS. 18 and 19, a sum of the transmission losses to which the excitation light is subjected in each communication path is the same between both cases. However, in the case that the drop point 31 with a relatively high drop loss is present closer to the ONU 20 side (subscriber side) (FIG. 19), the resulting gain is larger. This is because, in the case that the drop point 31 with a relatively high drop loss is present closer to the ONU 20 side (subscriber side) (FIG. 19), the communication can be performed in the longer section in a state where the intensity of the excitation light is high. Therefore, in determining the wavelength band of the excitation light, it is important to consider the position of each drop point 31 for the determination rather than simply determining the wavelength band with a low drop loss at the drop point 31.

Figure 20:
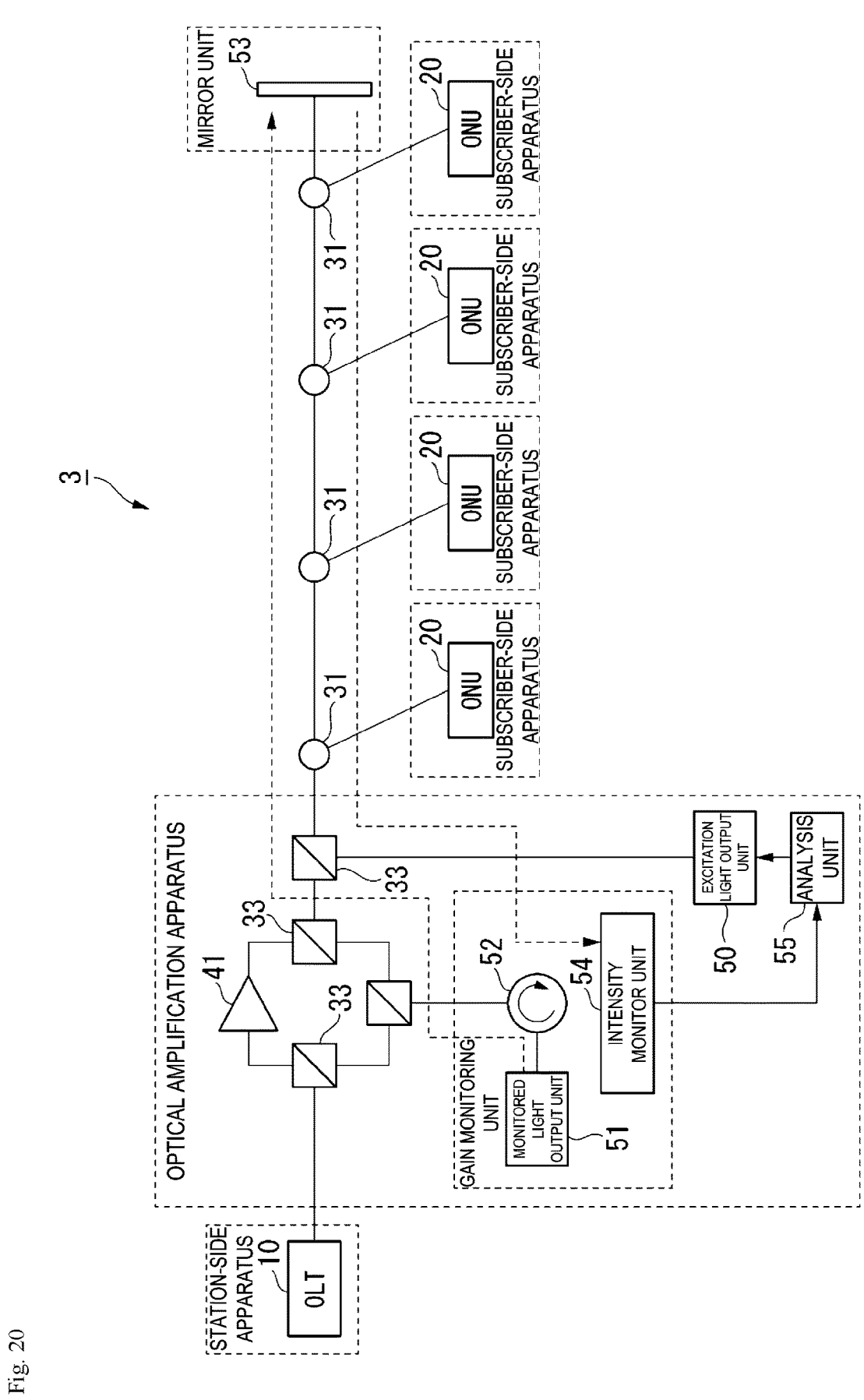
FIG. 20 is a schematic diagram illustrating a configuration of a bus type optical access network 3 in which a wavelength is swept to determine a wavelength of excitation light.

As a method for determining the wavelength of excitation light to maximize the Raman gain, for example, a method of sweeping a wavelength of excitation light while monitoring the Raman gain is contemplated. FIG. 20 is a schematic diagram illustrating a configuration of a bus type optical access network 3 in which a wavelength is swept to determine a wavelength of excitation light.

As illustrated in FIG. 20, the bus type optical access network 3 is an optical access network in which the concentrated optical amplifier 41 and the distributed Raman amplification technology are used. As illustrated in FIG. 20, the bus type optical access network 3 includes the drop points 31. In the present embodiment, each drop point 31 is a WDM optical coupler.

An optical amplification apparatus provided to the bus type optical access network 3 includes a gain monitoring unit, an excitation light output unit 50, and an analysis unit 55. The gain monitoring unit includes a monitored light output unit 51, a circulator 52, an intensity monitor unit 54, and the analysis unit 55. As illustrated in FIG. 20, the bus type optical access network 3 includes a mirror unit. The mirror unit includes a mirror 53. The mirror 53 reflects monitored light described below.

The gain monitoring unit monitors the Raman gain. The monitored light output unit 51 causes light in the wavelength band in which the Raman gain is obtained to be incident as monitored light on the communication path. The monitored light propagates in the trunk fiber, and thereafter, is reflected by the mirror 53 of the mirror unit disposed at the end of the trunk fiber. The reflected monitored light propagates again in the trunk fiber, and thereafter, is received by the intensity monitor unit 54 of the optical amplification apparatus. At this time, the excitation light output from the excitation light output unit 50 is swept so that the gain obtained by the monitored light entering the intensity monitor unit 54 changes.

In order to grasp the wavelength of the excitation light at which the gain is maximized, the method of sweeping the wavelength of the excitation light is effective, as described above, for example. In order to maximize the gain, the wavelength of the excitation light is swept to detect the wavelength of the excitation light at which an intensity of the monitored light detected by the intensity monitor unit 54 is maximum.

The analysis unit 55 detects an optimal wavelength of the excitation light with reference to the intensity of the monitored light detected by the intensity monitor unit 54 that changes as the wavelength of the excitation light is swept. The analysis unit 55 controls the wavelength of the excitation light output from the excitation light output unit 50 in accordance with the detection result.

Note that in a case that the transmittance of the monitored light with respect to the trunk fiber is low in the drop point 31, the intensity of the monitored light entering the intensity monitor unit 54 is low. As a result, measurement accuracy reduction is concerned. In this case, before setting the wavelength of the excitation light described above, it is necessary to sweep the wavelength of the monitored light to set the intensity of the monitored light entering the intensity monitor unit 54 to be sufficiently high.

As described above, the bus type optical access network (optical communication system) according to each of the above-described embodiments is configured to include the OLT 10 serving as a station-side apparatus and the plurality of ONUs 20 serving as subscriber-side apparatuses. The OLT 10 is connected to each of the plurality of ONUs 20 by the optical fiber that is wired in the bus topology. The optical amplification apparatus (optical amplification unit) serving the function to amplify an optical signal is connected between the OLT 10 and the communication path. The optical amplification apparatus separates the uplink signal and the downlink signal into different communication paths by the WDM optical coupler 33, and then, again couples. The concentrated optical amplifier 41 is installed in the communication path for the downlink signal. The concentrated optical amplifier 41 amplifies the downlink signal transmitted from the OLT 10. On the other hand, the uplink signal transmitted from the ONU 20 propagates through the communication path, and thereafter, passes through the optical amplification apparatus and is received by the OLT 10. Excitation light for amplifying the uplink signal is incident on the communication path from the optical amplification apparatus. Once the uplink signal enters the region where the intensity of the excitation light is high in the communication path, the uplink signal is gradually amplified by the effect of the distributed Raman amplification. Furthermore, the WDM optical coupler is used to reduce the drop loss experienced by the excitation light at the drop point 31 (drop unit) and to maximize the Raman gain. The WDM optical coupler branches one input signal into a plurality of output ports, and changes the branching ratio in accordance with the wavelength of the optical signal.

With such a configuration, the bus type optical access network according to each of the embodiments of the present invention can keep the intensity of the excitation light high even in the far area (i.e., the area farther away from the OLT 10), and thus, can maximize the Raman gain. Therefore, according to the present invention, the transmission distance in the bus type optical access network can be increased.

A part of the optical access network according to each of the embodiments described above may be implemented by a computer. In that case, the functions may be implemented by recording a program for implementing the functions in a computer-readable recording medium and causing a computer system to read and execute the program recorded in the recording medium. Note that the "computer system" referred herein includes an OS and hardware of a peripheral device. The "computer-readable recording medium" means a portable medium such as a flexible disk, a magneto-optical disk, a ROM, or a CD-ROM, or a recording device such as a hard disk incorporated in the computer system. Moreover, the "computer-readable recording medium" may include a recording medium that dynamically holds the program for a short period of time, such as a communication line in a case in which the program is transmitted via a network such as the Internet or a communication line such as a telephone line, or a recording medium that holds the program for a specific period of time, such as a volatile memory inside a computer system that serves as a server or a client in that case. Furthermore, the aforementioned program may be for implementing some of the aforementioned functions, or may be able to implement the aforementioned functions in combination with a program that has already been recorded in the computer system, or using a programmable logic device such as a field programmable gate array (FPGA).

Although the embodiment of the present invention has been described in detail with reference to the drawings, a specific configuration is not limited to the embodiment, and a design or the like in a range that does not depart from the gist of the present invention is included.

REFERENCE SIGNS LIST

10 . . . OLT
15 . . . Optical fiber
16 . . . Trunk fiber
17 . . . Branch fiber
20 . . . ONU
30 . . . Optical splitter
31 . . . Drop point
32 . . . Unequal branch optical splitter
33 . . . WDM optical coupler
40 . . . Optical amplifier
41 . . . Concentrated optical amplifier
50 . . . Excitation light output unit
51 . . . Monitored light output unit
52 . . . Circulator
53 . . . Mirror
54 . . . Intensity monitor unit
55 . . . Analysis unit

The invention claimed is:

1. An optical communication system configured with a station-side apparatus and a plurality of subscriber-side apparatuses in a bus network topology, the optical communication system comprising:
an optical amplification unit installed on a station side; and
a drop unit configured to branch an optical signal and excitation light,
wherein the optical amplification unit includes
an amplifier configured to amplify a downlink signal, and
an excitation light output unit configured to output the excitation light for amplifying an uplink signal to a communication path, and
the drop unit changes a branching ratio in accordance with a wavelength of the optical signal so that a transmission loss of the excitation light with respect to a trunk fiber is reduced.

2. The optical communication system according to claim 1, wherein
in a case that the optical signal is a WDM signal including a plurality of wavelengths,
the drop unit includes a WDM optical coupler in which a transmittance periodically changes depending on the wavelengths of the WDM signal.

3. The optical communication system according to claim 1, further comprising
a mirror unit installed on a subscriber side,
wherein the optical amplification unit further includes
a monitored light output unit configured to output monitored light to a communication path,
an intensity monitor unit configured to detect an intensity of the monitored light reflected by the mirror unit, and
an analysis unit configured to determine a wavelength of the excitation light with reference to the intensity detected by the intensity monitor unit, and control the excitation light output unit to output the excitation light having the determined wavelength.

4. The optical communication system according to claim 3, wherein
the analysis unit determines the wavelength so that the intensity of the monitored light detected by the intensity monitor unit is maximum.

5. The optical communication system according to claim 4, wherein
the excitation light output unit sweeps the wavelength of the excitation light output to the communication path, and
the analysis unit determines the wavelength so that the intensity of the monitored light changing as the wavelength of the excitation light is swept is maximum.

6. The optical communication system according to claim 1, wherein
in a case that the excitation light includes a plurality of wavelengths, the excitation light output unit uses, as excitation light, light having a wavelength at which a transmittance in the drop unit with respect to the trunk fiber is high.

7. An optical communication method by an optical communication system configured with a station-side apparatus and a plurality of subscriber-side apparatuses in a bus network topology, the optical communication method comprising:
branching an optical signal and excitation light;
amplifying a downlink signal by an amplifier installed on a station side;
outputting the excitation light for amplifying an uplink signal to a communication path; and
in the branching, changing a branching ratio in accordance with a wavelength of the optical signal so that a transmission loss of the excitation light with respect to a trunk fiber is reduced.

* * * * *